United States Patent
Takada et al.

(10) Patent No.: US 7,994,765 B2
(45) Date of Patent: Aug. 9, 2011

(54) POWER SUPPLY DEVICE

(75) Inventors: Masahiro Takada, Osaka (JP);
Toshihiko Ichinose, Nara (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 11/882,972

(22) Filed: Aug. 8, 2007

(65) Prior Publication Data

US 2008/0036432 A1    Feb. 14, 2008

(30) Foreign Application Priority Data

Aug. 9, 2006  (JP) .................. 2006-217465

(51) Int. Cl.
*G05F 1/56* (2006.01)
*G05F 1/563* (2006.01)
*G05F 1/565* (2006.01)

(52) U.S. Cl. ........... 323/282; 323/271; 323/284; 361/18

(58) Field of Classification Search .............. 323/222, 323/223, 282, 284, 285, 299, 271; 361/79, 361/82, 84, 87, 18
See application file for complete search history.

(56) References Cited

U.S. PATENT DOCUMENTS

| | | | |
|---|---|---|---|
| 6,590,370 B1 | 7/2003 | Leach | |
| 6,621,257 B2 * | 9/2003 | Mitamura et al. ............ | 323/282 |
| 6,846,586 B2 * | 1/2005 | Aramaki ......................... | 429/22 |
| 2004/0000895 A1 * | 1/2004 | Solivan ........................ | 323/271 |
| 2004/0174072 A1 * | 9/2004 | Bourilkov et al. .............. | 307/66 |
| 2004/0219399 A1 * | 11/2004 | Zhu et al. ........................ | 429/13 |
| 2006/0006850 A1 * | 1/2006 | Inoue et al. ................... | 323/265 |
| 2006/0194082 A1 * | 8/2006 | Tucker et al. ..................... | 429/9 |
| 2006/0197382 A1 * | 9/2006 | Chou et al. ...................... | 307/48 |

FOREIGN PATENT DOCUMENTS

JP    2006-501798    1/2006

* cited by examiner

*Primary Examiner* — Adolf Berhane
*Assistant Examiner* — Nusrat J Quddus
(74) *Attorney, Agent, or Firm* — McDermott Will & Emery LLP

(57) ABSTRACT

A power supply device, comprising first and second lead terminals for connection with a load, a fuel cell, an energy storage element connected between the first and second lead terminals, a synchronous-rectification switching power-source portion for converting the output voltage of the fuel cell to the output voltage of the energy storage element and outputting it to the first and second lead terminals, and a current-detecting portion for detecting the output current of the fuel cell, the switching power-source portion further comprising a first switching element connected to the energy storage element in series, a second switching element connected to the energy storage element in parallel, and a simultaneous-turn-off controller for turning off the first and second switching elements simultaneously when the output current detected by the current-detecting portion is not larger than a preset current threshold.

7 Claims, 6 Drawing Sheets

POWER SUPPLY DEVICE

BACKGROUND OF THE INVENTION

1. Field of the Invention

The present invention relates to a power supply device for converting the power generated in a fuel cell to a particular voltage level and supplying it to a load.

2. Description of the Prior Art

Recently, secondary batteries such as lithium ion battery and nickel metal-hydride battery have been used as the power source for portable electronic devices such as personal computer and electrical machines such as electric tool. However, when such a device is operated by using a secondary battery, the continuous operational period of the device is limited, because of restriction in battery capacity. For example, when portable personal computer is operated with a secondary battery, the continuous power-supply period is usually, for example, about 4 hours.

Recently on the other hand, fuel cells that can supply power continuously for a longer period are attracting attention. In the case of power supply to personal computer, a fuel cell supplying power continuously for 20 to 40 hours is desirable. The fuel cell has a configuration in which multiple unit cells each having an electrolyte layer held between a fuel electrode (−) and an air electrode (+) are laminated, and the power is generated in an electrochemical reaction, while fuel is supplied to the fuel electrode and air to the air electrode. The fuel for use is, for example, hydrogen or methanol. The output voltage of such a fuel cell does not always agree well with the power-supply voltage for operation that the load device demands, and thus, used is a DC-DC converter that converts the output voltage of the fuel cell to the power-supply voltage for operation of the load device (see, for example, Japanese Patent Unexamined Publication No. 2006-501798 (FIG. 1A)).

FIG. 6 is a circuit diagram showing a power supply device employing the DC-DC converter described in the BACKGROUND OF THE INVENTION. The power supply device 101 shown in FIG. 6 has a fuel cell 102, a DC-DC converter 103, and a secondary battery 104, and the terminal voltage of the secondary battery 104 is outputted to a load 105. The DC-DC converter 103 is a voltage-boosting DC-DC converter that raises the output voltage of the fuel cell 102. The DC-DC converter 103 has a coil 106, a diode 107, and a switching element 108.

The cathode terminal of the fuel cell 102 is connected via the coil 106, the diode 107, and the secondary battery 104 to the anode terminal of the fuel cell 102. In addition, the switching element 108 is connected in parallel with the series circuit of the diode 107 and secondary battery 104. In the DC-DC converter 103 in such a configuration, there is generated power loss at a magnitude of the product of the forward voltage of the diode 107 and the output current during flow of the output current supplied to the load through the diode 107.

For example, even when a schottky barrier diode having a smaller forward voltage is used as the diode 107, the forward voltage thereof is at least 0.3 V. Accordingly, if the output current is for example 10 A, the power loss in the diode 107 is 10 A×0.3 V=3 W.

Recently, synchronous-rectification DC-DC converters, which use a small on-resistance power MOSFET (Metal Oxide Semiconductor Field Effect Transistor) replacing the diode 107, have been used more frequently. FIG. 7 is a circuit diagram showing a power supply device 110 employing such a synchronous-rectification DC-DC converter 112. The DC-DC converter 112 is different from the DC-DC converter 103 shown in FIG. 6, in that the diode 107 is replaced with a switching element 116. Also in the power supply device 110, a secondary battery 113 is used, replacing the secondary battery 104 in the power supply device 101. The fuel cell 102, which is less sensitive to fluctuation of the load current, absorbs the fluctuation of load current caused by charge/discharge of the secondary battery 113.

In such a case, when a power MOSFET (e.g., IRF7809, manufactured by International Rectifier) is used as the switching element 116, the on-resistance becomes 7 mΩ. If the output current is for example 10 A, the power loss then in the switching element 116 is 10 A×10 A×7 mΩ=0.7 W, which is lower than the power loss in the diode 107 of the DC-DC converter 103 described above.

In the DC-DC converter 112 in such a configuration, a control signal at a particular duty ratio is outputted from a switching controller 114 to a switching element 108 and an inverter 117, and the signal inverted by the inverter 117 is outputted to the switching element 116. In this way, the DC-DC converter 112 controls on/off duty by turning the switching elements 108 and 116 on and off alternately by the switching controller 114, and thus controls the output voltage of the fuel cell consistently.

The voltage multiplication ratio (Vo/Vi) of the DC-DC converter 112 is represented by the following Equation (1), wherein Vi denotes an output voltage of the fuel cell, or an input voltage of the DC-DC converter 112; Vo denotes an output voltage of the DC-DC converter 112; and D denotes an on-duty ratio of the switching element 108:

$$Vo/Vi = 1/(1-D) \qquad (1).$$

Because the secondary battery 113 is connected to the output terminal of the DC-DC converter 112, the output voltage Vo in Equation (1) is equal to the output voltage of the secondary battery 113. The on-duty ratio D is so controlled that the Vi then reaches a preset value.

However, use of a synchronous-rectification DC-DC converter 112 for reduction of power loss results for example in decrease of the output power of the fuel cell 102 by insufficient supply of fuel, significant increase of the output impedance of the fuel cell 102, and thus, deterioration of the output current of the fuel cell 102, and then, the current flow through the switching element 116 in the reverse direction, differently from the diode 107, and the on-duty ratio D is so controlled that the output voltage of the fuel cell Vi becomes a preset value. In such a case, there is a concern about the current flow in the reverse direction from the secondary battery 113 via switching element 116 and coil 106 to the fuel cell 102 damaging the fuel cell 102.

As described above, in a power supply device employing a fuel cell, an energy storage element such as secondary battery or capacitor is connected to the output terminal of the DC-DC converter, because of the fuel cell's characteristic of low responsiveness to the fluctuation in load current. There remained still problems that, when such an energy storage element is installed in the power supply device employing a fuel cell, use of a small-power-loss synchronous-rectification DC-DC converter may cause current back flow from the energy storage element to the fuel cell, and that it may damage the fuel cell because the fuel cell is characteristically degraded by the current back flow.

SUMMARY OF THE INVENTION

The present invention, which was worked out in consideration of the peculiar problems in power supply devices employing a fuel cell, has an object to provide a power supply device which can prevent degradation of a fuel cell by using a synchronous-rectification switching power source having a power loss smaller than that of a non-synchronous-rectification DC-DC converter using diode to thereby restrict the current back flow to the fuel cell.

According to an aspect of the present invention, a power supply device comprises a first terminal and a second lead terminal for connection with a load, a fuel cell, an energy storage element connected to the first and second lead terminals, a synchronous-rectification switching power-source portion for converting an output voltage of the fuel cell to an output voltage of the energy storage element to output it to the first and second lead terminals, and a current-detecting portion for detecting an output current of the fuel cell. The switching power-source portion includes a first switching element connected to the energy storage element in series, a second switching element connected to the energy storage element in parallel, and a controller for executing a simultaneous-turn-off control of turning off the first and second switching elements simultaneously when an output current detected by the current-detecting portion is not larger than a preset current threshold.

In the configuration, the output power of the fuel cell is supplied to the load connected between the first and second lead terminals by the synchronous-rectification switching power-source portion. In addition, when the output current of the fuel cell detected by the current-detecting portion is not larger than the preset current threshold, the first and second switching elements are turned off simultaneously by the controller, and thus, even when the output current of the fuel cell is lowered, preventing the output current of the energy storage element flows back via the first and second switching elements to the fuel cell, protecting the fuel cell from degradation.

These and other objects, features, aspects and advantages of the present invention will become more apparent upon a reading of the following detailed description and accompanying drawings.

DETAILED DESCRIPTION OF THE PREFERRED EMBODIMENTS OF THE INVENTION

Hereinafter, favorable embodiments of the present invention will be described with reference to drawings. The components indicated by the same code in respective Figures are the same as each other, and thus, duplicated description thereof will be omitted.

First Embodiment

Figure 1:
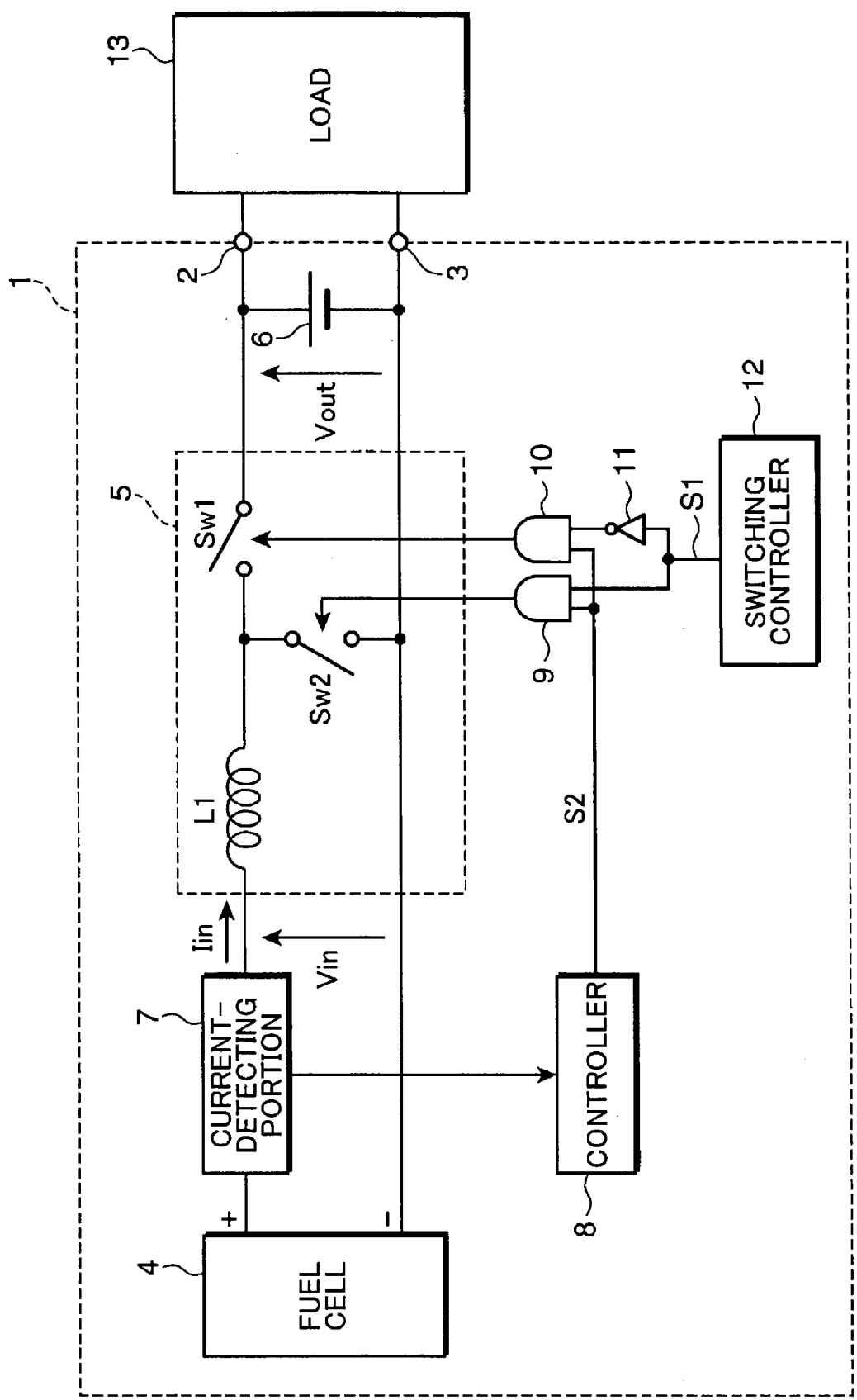
FIG. 1 is a circuit diagram showing a configuration of a power supply device according to a first embodiment of the invention.

FIG. 1 is a circuit diagram showing an example of the configuration of the power supply device in the first embodiment of the present invention. The power supply device 1 shown in FIG. 1 has a lead terminal 2 (first lead terminal), a lead terminal 3 (second lead terminal), a fuel cell 4, a DC-DC converter 5, a secondary battery 6 (energy storage element), a current-detecting portion 7, a controller 8, AND gates 9 and 10, an inverter 11, and a switching controller 12 (controller).

The DC-DC converter 5, the controller 8, the switching controller 12, AND gates 9 and 10, and the inverter 11 form an example of the synchronous-rectification switching power-source portion.

The DC-DC converter 5 is a so-called synchronous-rectification DC-DC converter that has a coil L1, a switching element SW1 (first switching element), and a switching element SW2 (second switching element). The switching power-source portion is not limited to the case having a DC-DC converter, and thus, may have, for example, a synchronous-rectification AC-DC converter.

A load 13 is connected between the lead terminals 2 and 3. Each of the lead terminals 2 and 3 is not particularly limited, if the load 13 can be connected between them, and may be, for example, a connector or a wiring pattern such as land or pad. The load 13 is an electrical device to which power is supplied from the power supply device 1, such as a main unit of a portable personal computer or a cellphone terminal device.

The fuel cell 4 generates power with a fuel such as methanol or hydrogen supplied from a fuel-supplying unit not shown in the Figure, and outputs the obtained power to the cathode and anode terminals. The cathode terminal of the fuel cell 4 is connected to the lead terminal 2 via the current-detecting portion 7, the coil L1, and the switching element SW1. Alternatively, the anode terminal of the fuel cell 4 is connected to the lead terminal 3.

The positive electrode terminal of the secondary battery 6 is connected to the lead terminal 2, while the negative electrode terminal of the secondary battery 6 to the lead terminal 3. Thus, the switching element SW1 and the secondary battery 6 are connected to each other in series, as seen from the fuel cell 4. In addition, a switching element SW2 is placed between the connection point of the coil L1 and the switching element SW1 and the anode terminal of the fuel cell 4, i.e., in parallel with the series circuit of the switching element SW1 and the secondary battery 6.

Thus, the terminal voltage of the secondary battery 6 is supplied as the output voltage Vout of the power supply device 1, via the lead terminals 2 and 3 to the load 13.

For example, an energy storage element such as lithium-ion secondary battery or nickel metal-hydride secondary battery is used as the secondary battery 6. In such a case, for example, the output voltage Vout is 4.2 V when the secondary battery 6 is a lithium-ion secondary battery, while the output voltage Vout is 1.2 V when the secondary battery 6 is a nickel metal-hydride secondary battery. The secondary battery 6 may be multiple lithium-ion secondary batteries or nickel metal-hydride secondary batteries connected to each other in series or parallel. A capacitor may be used as the energy storage element, instead of the secondary battery 6.

A small on-resistance switching element, for example a switching element such as power MOSFET (e.g., IRF7809, manufactured by International Rectifier) may be used as the switching element SW1 or SW2.

The switching controller 12 controls the ratio of the output voltage Vout to the input voltage Vin of the DC-DC converter 5 (Vout/Vin), by adjusting the on/off duty of the switching elements SW1 and SW2. The switching controller 12 outputs a control signal S1 having a duty ratio D satisfying the conditions represented by the following Equation (2), wherein Vin denotes an output voltage of the fuel cell 4, i.e., an input voltage of the DC-DC converter 5, and Vout denotes a terminal voltage of the secondary battery 6, i.e., an output voltage of the DC-DC converter 5:

$$Vout/Vin=1/(1-D) \quad (2).$$

Vout/Vin in Equation (2) represents the voltage multiplication ratio a of the DC-DC converter 5.

The switching controller 12 adjusts the output current Iin flowing from the fuel cell 4 into the DC-DC converter 5, to make the input voltage Vin outputted from the fuel cell 4 retain a set output voltage setting by adjusting the duty ratio D, and thus, makes the DC-DC converter 5 operate as a constant-input-voltage DC-DC converter.

The power-generating efficiency of the fuel cell 4 varies according to the output voltage, and thus, it is possible to improve the power-generating efficiency of the fuel cell, by controlling the DC-DC converter 5 to make the output voltage of the fuel cell 4 agree with the output voltage setting for favorable power-generating efficiency, with the switching controller 12. When the DC-DC converter 5 is controlled as a constant-input-voltage DC-DC converter by the switching controller 12, if the output voltage of the fuel cell 4 becomes lower than the output voltage setting while the output current Iin is zero, the DC-DC converter 5 increases the output voltage of the fuel cell 4 to the output voltage setting by feeding the output current of the secondary battery 6 back to the fuel cell 4.

Although the output current of the secondary battery 6 may flow back to the fuel cell 4, damaging the fuel cell 4 in the constant-input-voltage DC-DC converter, even in such a case, the control signal S2 is kept at a low level by the controller 8, simultaneously turning off the switching elements SW1 and SW2 for prevention of current back flow, and thus, it is possible to reduce the concern about deterioration of the fuel cell 4. Accordingly, the power supply device 1 is used favorably in combination with a constant-input-voltage DC-DC converter.

Figure 2:
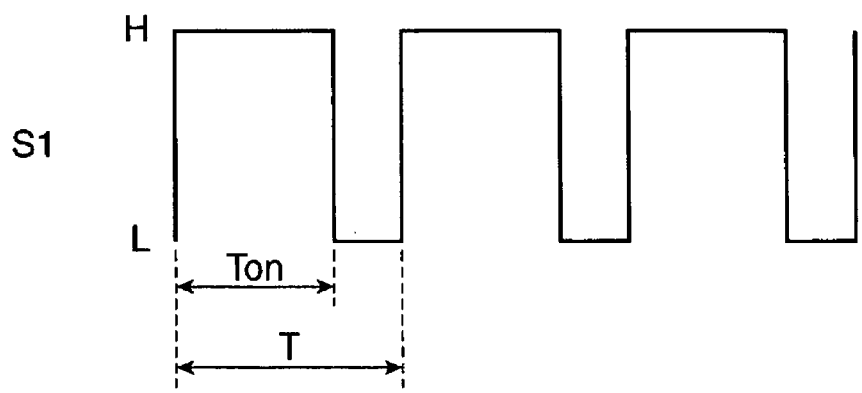
FIG. 2 is a signal-waveform chart showing a control signal outputted from a switching controller shown in FIG. 1.

FIG. 2 is a chart showing an example of the waveform of the control signal S1. As shown in FIG. 2, when the period of the control signal S1 is designated as T, and the period of the control signal S1 at high level (H), Ton, the duty ratio D is expressed by Ton/T.

The control signal S1 thus obtained is outputted from the switching controller 12 via the AND gate 9 to the switching element SW2; the switching element SW2 is turned on when the control signal S1 is at high level and turned off when the control signal S1 is at low level; and thus, the switching element SW2 is turned on and off in such a manner that the switching element SW2 become on duty at a duty ratio of D. The control signal S1 outputted from the switching controller 12 is inverted by the inverter 11 and outputted via the AND gate 10 to the switching element SW1. In this way, the switching element SW1 is turned off when the switching element SW2 is on and turned on when the switching element SW2 is off. In other words, the switching elements SW1 and SW2 are turned on and off alternately.

Thus, operation of the switching elements SW1 and SW2 is controlled according to the control signal S1 from the switching controller 12, and an output voltage Vout obtained according to the Equation (2) is outputted from the DC-DC converter 5 via the lead terminals 2 and 3 to the load 13. Excess power is stored in the secondary battery 6 when the output power of the DC-DC converter 5 is larger than the power consumption of the load 13, and the insufficient power is supplied from the secondary battery 6 to the load 13 when the output power of the DC-DC converter 5 is smaller than the power consumption of the load 13, thus reducing fluctuation of the power consumption by the load 13.

The current-detecting portion 7 detects the output current Iin flowing from the fuel cell 4 to the DC-DC converter 5 and outputs the detected value to the controller 8. For example, a current sensor such as shunt resistance or Hall element is used as the current-detecting portion 7.

Figure 3:
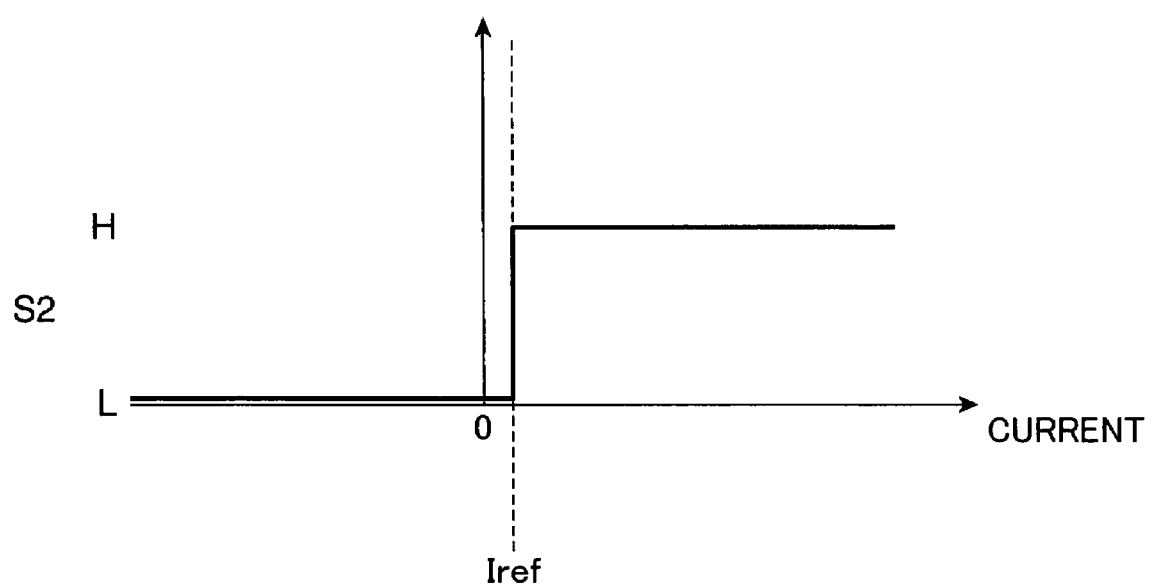
FIG. 3 is a signal-waveform chart explaining operation of the controller shown in FIG. 1.

The controller 8, which has for example a comparator, is a control circuit turning the switching elements SW1 and SW2 off when the output current Iin detected by current-detecting portion 7 is smaller than the preset current threshold Iref. The current threshold Iref is set, for example, to a current slightly larger than zero. FIG. 3 is a signal-wave chart explaining operation of the controller 8. In FIG. 3, the abscissa axis indicates the current of the output current Iin detected by the current-detecting portion 7. The control signal S2 outputted from the controller 8 is set to the low level (L) when the output current Iin is smaller than the current threshold Iref, and to the high level (H) and outputted to the AND gates 9 and 10 when the output current Iin is larger than the current threshold Iref.

In this case, when the output current Iin of the fuel cell 4 drops to be smaller than the current threshold Iref, the controller 8 controls the control signal S2 to be at low level and thus, the output signals of the AND gates 9 and 10 both at low level, consequently turning both the switching elements SW1 and SW2 off.

In the power supply device 1 in the configuration described above, the power generated in the fuel cell 4 is supplied to the DC-DC converter 5. The switching element SW2 is turned on and off at a duty ratio of D according to the control signal S1 outputted from the switching controller 12. In addition, the switching element SW1 is turned off when the switching element SW2 is on and turned on when the switching element SW2 is off, according to the control signal S1 reversed by the inverter 11.

In this way, the power generated in the fuel cell 4 is adjusted to the output voltage Vout by the DC-DC converter 5 and sent via the lead terminals 2 and 3 to the load 13, while the switching elements SW1 and SW2 are turned on and off by the switching controller 12 alternately. Excess power is stored in the secondary battery 6 when the output power of the DC-DC converter 5 is larger than the power consumption of the load 13, and insufficient power is supplied from the secondary battery 6 to the load 13 when the output power of the DC-DC converter 5 is smaller than the power consumption of the load 13, thus reducing fluctuation of the power consumption of the load 13.

When the output current Iin of the fuel cell 4 decreases, for example because of insufficiency of the fuel for the fuel cell 4 and the output current Iin reaches the current threshold Iref, the controller 8 gives the control signal S2 be at low level according to the output current Iin detected by the current-detecting portion 7, before back flow of the current from the secondary battery 6 to the fuel cell 4. Because the current back flow is blocked as the switching elements SW1 and SW2 are turned off by the AND gates 9 and 10, it is possible to reduce the power loss by using the synchronous-rectification DC-DC converter 5 and also to prevent degradation of the fuel cell 4 by the current back flow.

Second Embodiment

Figure 4:
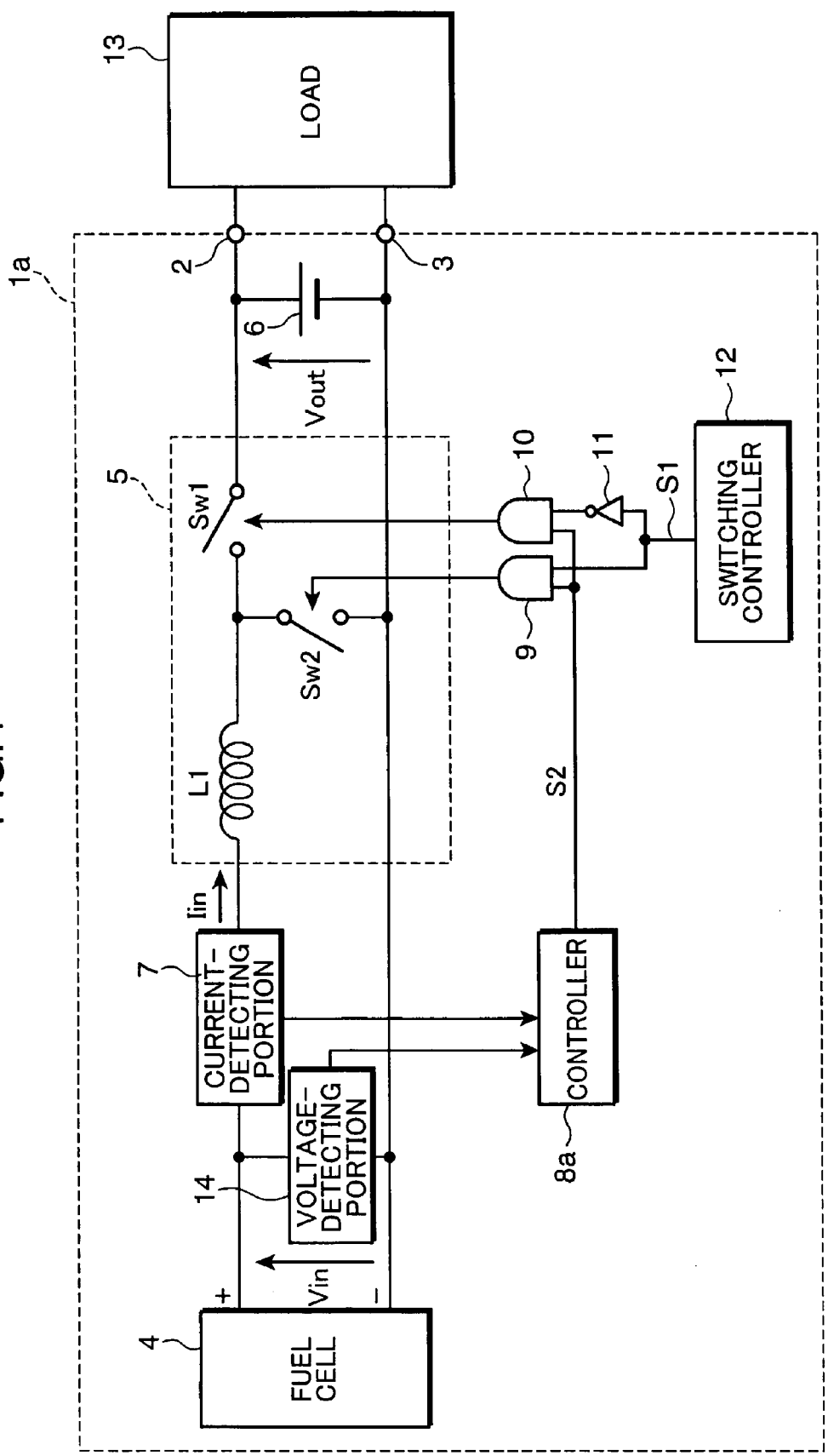
FIG. 4 is a circuit diagram-showing a configuration of a power supply device according to a second embodiment of the invention.

Hereinafter, the power supply device in the second embodiment of the present invention will be described. FIG. 4 is a circuit diagram showing an example of the configuration of the power supply device 1a in the second embodiment of the present invention. The power supply device 1a shown in FIG. 4 is different from the power supply device 1 shown in FIG. 1, in that it has an additional voltage-detecting portion 14 and its controller 8a has a different configuration. The other configuration is the same as that of the power supply device 1 shown in FIG. 1, and description thereof is omitted, and only the configuration characteristic in the present embodiment will be described.

The voltage-detecting portion 14 detects the output voltage of the fuel cell 4, i.e., the input voltage Vin of the DC-DC converter 5, and outputs the voltage of the input voltage Vin to the controller 8a. The voltage-detecting portion 14 may be, for example, an amplifier bringing the input voltage Vin to a voltage level allowing processing in the controller 8a or a wiring that applies the input voltage Vin directly to the controller 8a.

When the current of the output current Iin detected by the current-detecting portion 7 is not larger than the current threshold Iref, or when the voltage of the input voltage Vin detected by the voltage-detecting portion 14 is not larger than the voltage threshold Vref2 that is set to a voltage lower than the voltage threshold Vref1, the controller 8a turns both the switching elements SW1 and SW2 off by bringing the control signal S2 into low level and the output signals from the AND gates 9 and 10 into low level.

Figure 5:
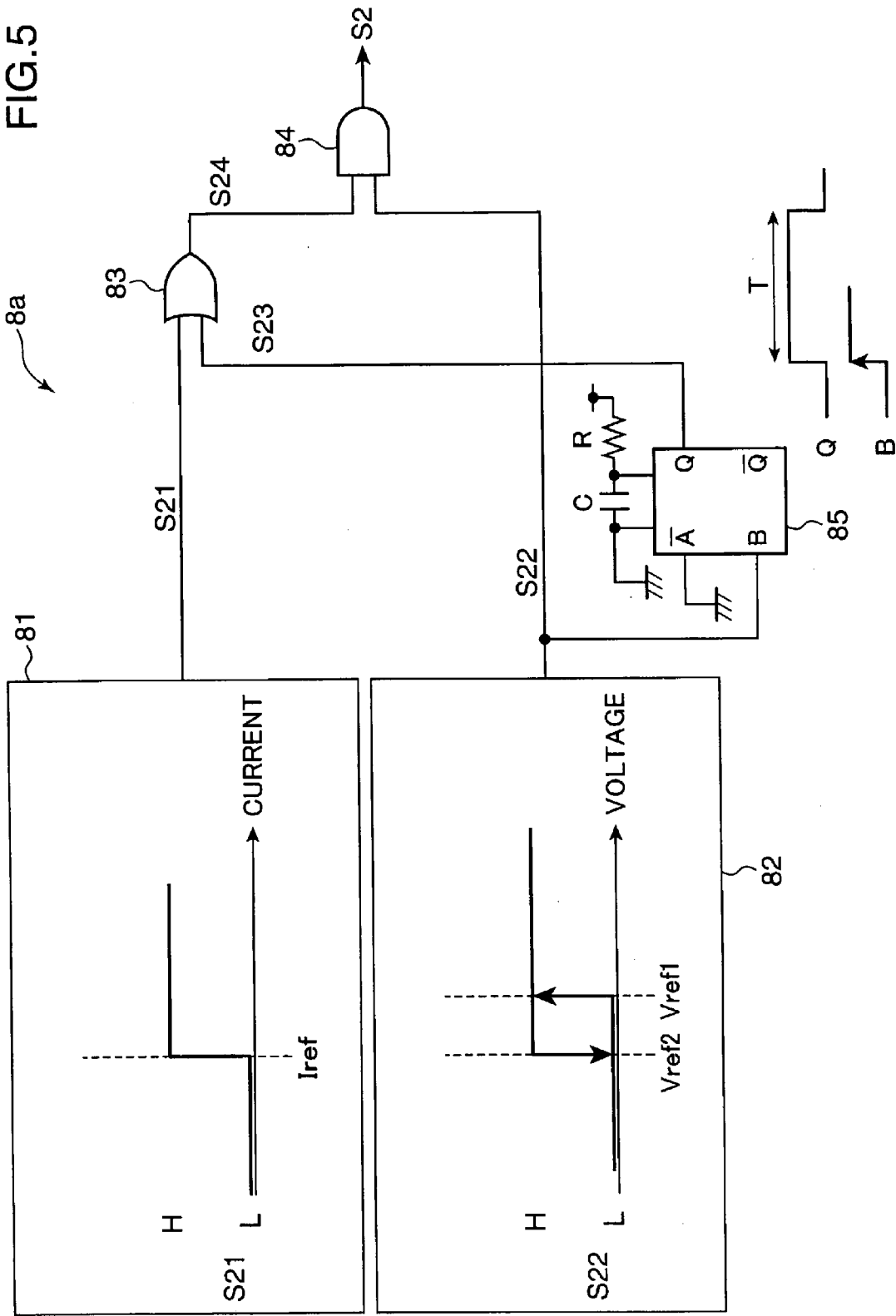
FIG. 5 is a circuit diagram showing a configuration of a controller shown in FIG. 4.
Figure 6:
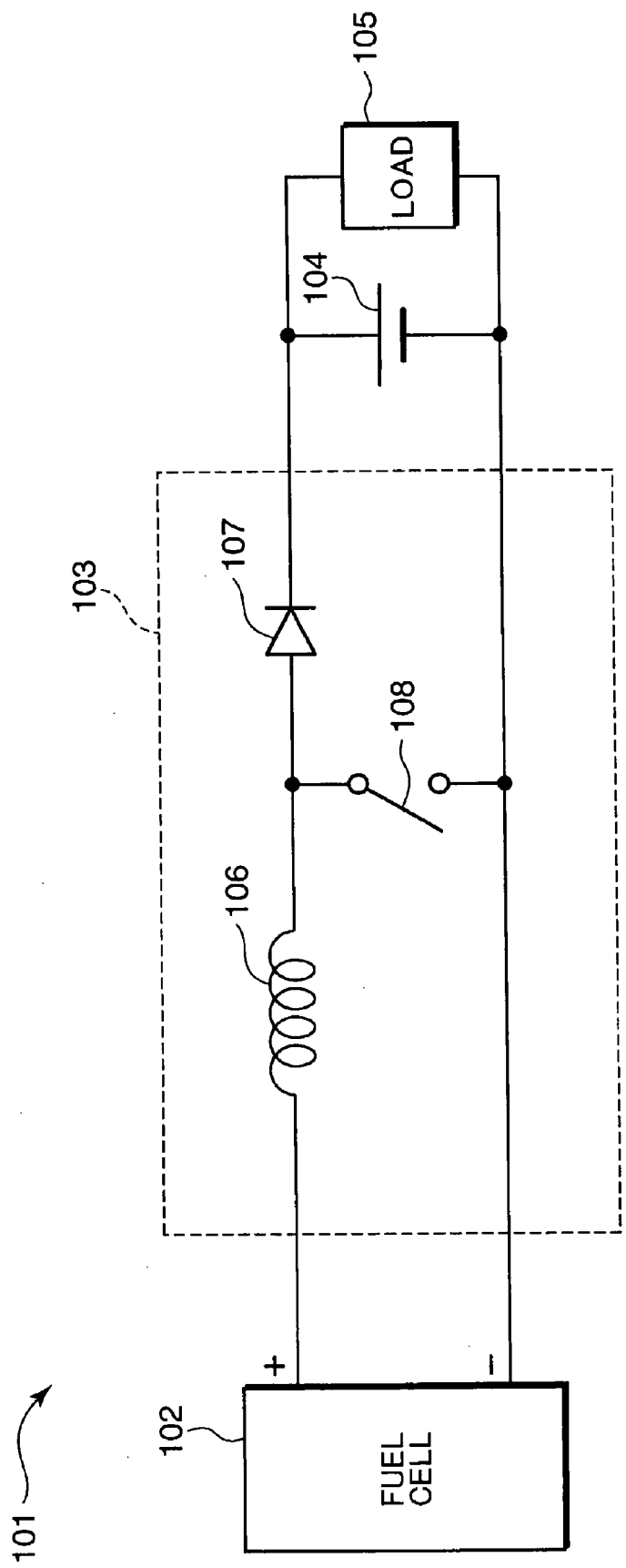
FIG. 6 is a circuit diagram showing a power supply device described in the Background of the invention.
Figure 7:
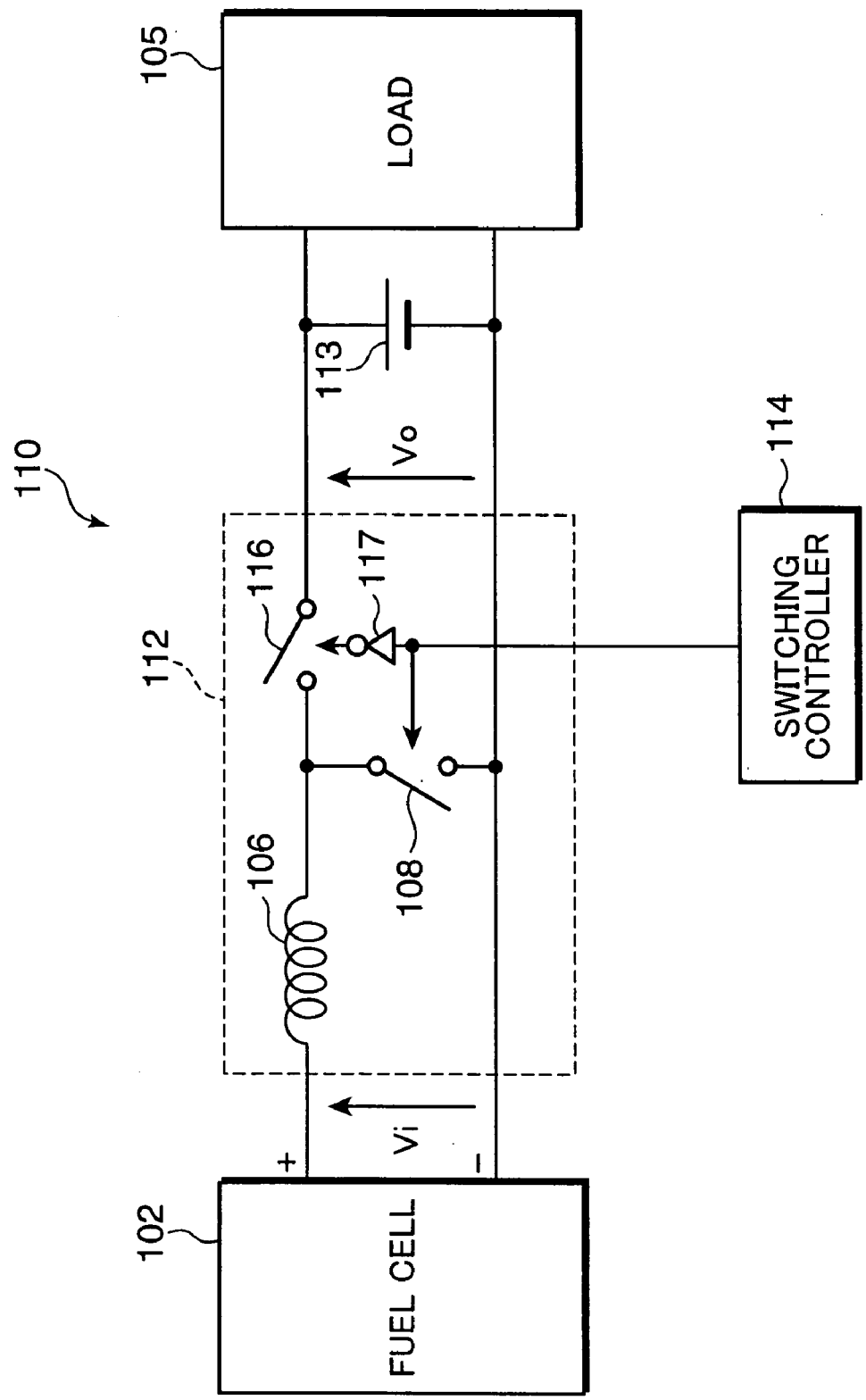
FIG. 7 is a circuit diagram showing another power supply device described in the Background of the invention.

FIG. 5 is a circuit diagram showing an example of the configuration of the controller 8a. The controller 8a shown in FIG. 5 has, for example, a current-comparing portion 81, a voltage-comparing portion 82, an OR gate 83, an AND gate 84, and a multivibrator 85 (suspension controlling portion).

The current-comparing portion 81 compares the output current Iin detected by the current-detecting portion 7 with the current threshold Iref and outputs the result of comparison, a signal S21, to the OR gate 83. The current-comparing portion 81 has, for example, a reference voltage source generating reference voltage having a current threshold of Iref and a comparator comparing the voltage showing the output current Iin outputted from the current-detecting portion 7 with the reference voltage showing a current threshold of Iref. The signal S21 is elevated into high level (H) by the current-comparing portion 81 when the output current Iin is larger than the current threshold Iref, and the signal S21 is lowered into low level (L) when the output current Iin is not larger than the current threshold Iref.

The voltage-comparing portion 82 compares the input voltage Vin detected by the voltage-detecting portion 14 with the voltage threshold Vref1 and outputs a signal S22 elevated to high level (H) to the AND gate 84 and the trigger terminal B of the multivibrator 85 when the input voltage Vin is larger than the voltage threshold Vref1. The voltage-comparing portion 82 also compares the input voltage Vin detected by the voltage-detecting portion 14 with the voltage threshold Vref2 and outputs a signal S22 at lowered level (L) to the AND gate 84 and the trigger terminal B of the multivibrator 85, when the input voltage Vin becomes not larger than the voltage threshold Vref2. The voltage-comparing portion 82 has, for example, a comparator showing hysteresis and a reference voltage source generating reference voltages having voltage thresholds of Vref1 and Vref2.

The multivibrator 85 is an example of a suspension controlling portion. The multivibrator 85 suspends the control operation which is executed by the switching elements SW1 and SW2 according to the output current Iin during start-up of the power supply device 1a. Thus, there is less concern about the power supply device 1a not being started up due to the current-comparing portion 81 judges that the output current Iin is not larger than the current threshold Iref because the output current Iin is not flowing during start-up of the power supply device 1a, brings the control signal S2 into the low level, and turns the switching elements SW1 and SW2 off.

When the signal S22 is sent, the multivibrator 85 output a Q output signal S23 at high level to the OR gate 83 for a period T, which is determined by the resistor R and the capacitor C for output pulse setting. The constants of the resistor R and the capacitor C are previously so designed that the period T becomes, for example, 1 second.

The suspension controlling portion is not particularly limited to a multivibrator 85, if it prohibits the control signal S2 from becoming at low level during initiation of the operation of the DC-DC converter 5, as it is judged that the output current Iin is not larger than the current threshold Iref by the current-comparing portion 81 for a period T predetermined to be not shorter than the period when the fuel-cell output current becomes not smaller than Iref. For example, the power-source portion may be made under operation forcibly for a period T from initiation by the suspension controlling portion. The suspension controlling portion may be comprised of software.

The OR gate 83 outputs a signal S24, logical sum of the signals S21 and S23, to the AND gate 84. The AND gate 84 produces the logical product of the signals S22 and S24, and generates and outputs a control signal S2 to the AND gates 9 and 10.

Hereinafter, operation of the power supply device 1a in the configuration above will be described. First when the power supply device 1a is not in operation, the Q output signal S23 of the multivibrator 85 is at low level. The fuel cell 4 is also not in operation, and the input voltage Vin is 0 V. Then, the output signal S22 of the voltage-comparing portion 82 is at low level; the control signal S2 is brought into low level by the AND gate 84; the output signals from the AND gates 9 and 10 are brought into low level; and the switching elements SW1 and SW2 are turned off.

Then, during start-up of the power supply device 1a, the output voltage of the fuel cell 4 Vout increases, for example, as fuel is supplied to the fuel cell 4. The output current Iin remains unincreased then, even when the output voltage Vout increases, because the switching elements SW1 and SW2 are turned off, and thus, the output signal S21 of the current-comparing portion 81 remains in low level.

When the output voltage of the fuel cell 4 Vout becomes larger than the voltage threshold Vref1, under which there is no current back flow from the secondary battery 6, the voltage-comparing portion 82 raises the signal S22 into high level. The Q output signal S23 of the multivibrator 85 is then kept at high level for a period of T at the rising edge timing of the signal S22, and the output signal S24 of the OR gate 83 is brought into high level. Then, the signals S22 and S24 are both at high level, and a control signal S2 at high level is outputted from the AND gate 84 to the AND gates 9 and 10.

The control signal S1 outputted from the switching controller 12 is outputted by the AND gate 9 to the switching element SW2, and the switching element SW2 is turned on and off at the duty ratio D. The control signal S1 reversed by the inverter 11 is outputted to the switching element SW1 by the AND gate 10; and the switching elements SW1 and SW2 are turned on and off alternately, as the switching element SW1 is turned off when the switching element SW2 is on and turned on when the switching element SW2 is off.

In this way, the power generated in the fuel cell 4 is supplied via the lead terminals 2 and 3 to the load 13, as it is adjusted to an output voltage of Vout by the DC-DC converter 5. When the output power of the DC-DC converter 5 is larger than the power consumption of the load 13, the excess power is stored in the secondary battery 6, and, when the output power of the DC-DC converter 5 is smaller than the power consumption of the load 13, the insufficient power is supplied from the secondary battery 6 to the load 13, reducing fluctuation of power consumption by the load 13.

In such a case, when the output current of the fuel cell 4 decreases to a degree that the current flow may be reversed, for example because there is no fuel for the fuel cell 4, the output of the current-comparing portion 81 becomes at low level and the output current of the secondary battery 6 flows back via switching element SW1 and coil L1 and current-detecting portion 7 to the fuel cell 4, for prevention of degradation of the fuel cell 4.

In such a case, because the voltage threshold Vref2 is set to a voltage lower than the voltage threshold Vref1 and there is a difference from the voltage threshold Vref1, operation of the DC-DC converter 5 is executed when the input voltage Vin becomes larger than the voltage threshold Vref1, which is larger than the voltage threshold Vref2, and terminated when it becomes not larger than the voltage threshold Vref2, which is lower than the voltage threshold Vref1, and thus, it is possible to prevent unstabilized operation by repeated start up and termination of operation of the DC-DC converter 5 even when the output voltage of the fuel cell 4, or input voltage Vin, is in the unstabilized state, for example immediately after startup of power generation by the fuel cell 4.

The voltage threshold Vref1 may not be different from the voltage threshold Vref2, and the voltage threshold Vref1 may be the same as the voltage threshold Vref2.

In addition, the controller 8a is not limited to the embodiments described above such as comparator and logical gate, and for example, the current-detecting portion 7 and the voltage-detecting portion 14 may be an AD converter, and the controller 8a, a micro computer. The controller 8a shown in FIG. 4 has a current-comparing portion 81 and a voltage-comparing portion 82, but, for example, the output signal S22 from voltage-comparing portion 82 may be outputted to the AND gates 9 and 10 directly as the control signal S2, as the current-comparing portion 81, the multivibrator 85, the OR gate 83, and AND gate 84 are eliminated.

A power supply device according to an aspect of the present invention comprises a first lead terminal and a second lead terminal for connection with a load, a fuel cell, an energy storage element connected between the first and second lead terminals, a synchronous-rectification switching power-source portion for converting an output voltage of the fuel cell to an output voltage of the energy storage element and output it to the first and second lead terminals, and a current-detecting portion for detecting an output current of the fuel cell. The switching power-source portion includes a first switching element connected to the energy storage element in series, a second switching element connected to the energy storage element in parallel, and a controller for executing a simultaneous-turn-off control of turning off the first and second switching elements simultaneously when an output current detected by the current-detecting portion is not larger than a preset current threshold.

In the configuration above, the output power of the fuel cell is converted to the output voltage of the energy storage element, and charged to the energy storage element connected to the first and second lead terminals. The output current of the fuel cell is detected by the current-detecting portion. Further when the output current of the fuel cell detected by the current-detecting portion is smaller than a preset current threshold, the first and second switching elements are turned off by the controller, and thus, even when the output current of the fuel cell declines, the output current of the energy storage element flows back via the first and second switching elements to the fuel cell, preventing degradation of the fuel cell.

Preferably, the power supply device may be provided with a voltage-detecting portion for detecting an output voltage of the fuel cell. The controller makes the switching power-source portion execute a voltage-converting operation by turning the first and second switching elements on and off alternately when a voltage detected by the voltage-detecting portion is larger than the preset voltage threshold.

In the configuration, the output voltage of the fuel cell is detected by the voltage-detecting portion. When the voltage detected by the voltage-detecting portion is larger than the preset voltage threshold, and thus when there is no concern about the output current of the energy storage element flowing back via the first and second switching elements to the fuel cell, damaging the fuel cell even when the first and second switching elements are turned on, the voltage-converting operation of the switching power-source portion may be executed by turning the first and second switching elements on and off alternately.

The controller may be preferably provided with a suspension controlling portion for suspending the simultaneous-turn-off control for a preset period after starting the voltage-converting operation of the switching power-source portion.

In the configuration, when the first and second switching elements are turned off simultaneously and thus when the current from the fuel cell to the switching power-source portion is blocked, if the output current level detected by the current-detecting portion is smaller than the threshold or less, the simultaneous turn-off control is suspended by the suspension controlling portion for a predetermined period, and thus, there is less concern about the switching power-source portion not being started up the voltage-converting operation.

The controller may preferably adjust the current flowing from the fuel cell to the switching power-source portion by controlling the duty ratio of turning the first and second switching elements on and off alternately to keep the output voltage of the fuel cell at a set output voltage.

The power-generating efficiency of the fuel cell varies according to the output voltage, and thus, it is possible to improve the power-generating efficiency of the fuel cell, by keeping the output voltage of the fuel cell at a set output voltage favorable for power-generating efficiency by the switching power-source portion. Even when the current flowing from the fuel cell to the switching power-source portion is not available, for example when the output power of the fuel cell declines or the output impedance of the fuel cell increases significantly for example because of insufficient fuel, such a switching power-source portion supplies the output current of the energy storage element back to the fuel cell and raises the output voltage of the fuel cell to a predetermined output voltage setting. In consequence, although there is an increased concern about the output current of the energy storage element flowing back to the fuel cell and damaging the fuel cell, even in such a case, when the output current detected by the current-detecting portion is not larger than the threshold, the first and second switching elements are turned off simultaneously by the controller described above, and the current back flow is prevented, and thus, there is less concern about degradation of the fuel cell.

Preferably, the switching power-source portion may be further provided with a coil. In this case, one electrode of the fuel cell is connected via the coil and the first switching element to the first lead terminal, and the other electrode of the fuel cell is connected to the secondary lead terminal. The second switching element is connected between a connection point of the coil and the first switching element and the other electrode of the fuel cell.

In the configuration, power loss is reduced, because the switching power-source portion becomes a so-called synchronous-rectification switching power source circuit.

The duty ratio above may be preferably an on-duty ratio D of the second switching element, and the controller preferably adjusts the on-duty ratio D so that the output voltage Vin reaches the set output voltage in the following Equation (A), wherein Vout denotes an output voltage of the energy storage element; and Vin denotes an output voltage of the fuel cell;

$$Vout/Vin=1/(1-D) \qquad (A).$$

In the configuration, the on-duty ratio D of the second switching element is determined according to Equation (A), and the second switching element is turned on and off at the on-duty ratio D, and the on-duty ratio of the first switching element, which is turned on and off alternately to the first switching element, is set to 1–D.

A power supply device according to another aspect of the present invention comprises a first terminal and a second lead terminal for connection with a load, a fuel cell, an energy storage element connected between the first and second lead terminals, a synchronous-rectification switching power-source portion for converting an output voltage of the fuel cell to an output voltage of the energy storage element to thereby output it to the first and second lead terminals, and a current-detecting portion for detecting an output current of the fuel cell, and a voltage-detecting portion for detecting an output voltage of the fuel cell. The switching power-source portion includes a first switching element connected to the energy storage element in series, a second switching element connected to the energy storage element in parallel, and a controller for executing a simultaneous-turn-off control of turning the first and second switching elements off simultaneously when an output current detected by the current-detecting portion is not larger than the preset current threshold and adjustment of adjusting the current flowing from the fuel cell to the switching power-source portion by controlling the duty ratio of turning the first and second switching elements on and off alternately to keep the output voltage of the fuel cell at a set output voltage, and suspends the simultaneous-turn-off control for a preset period when the voltage detected by the voltage-detecting portion is larger than a preset voltage threshold, and executes the voltage-converting operation by the switching power-source portion by turning the first and second switching elements on and off alternately.

In the configuration, when the output current of the fuel cell detected by the current-detecting portion is not larger than the preset current threshold, the first and second switching elements are turned off by the controller, and thus, the output current of the energy storage element flows back via the first and second switching elements to the fuel cell, preventing degradation of the fuel cell, even when the output current of the cell declines. When the first and second switching elements are turned off simultaneously and thus the current flowing from the fuel cell to the switching power-source portion is blocked, if the output current level detected by the current-detecting portion is not larger than the threshold, the simultaneous turn-off control is suspended by the suspension controlling portion for a predetermined period, and thus, it is possible to prevent the switching power-source portion from not initiating the voltage-converting operation. When the voltage detected by the voltage-detecting portion is larger than the preset voltage threshold and thus, when there is no concern about the output current of the energy storage element flowing back via the first and second switching elements to the fuel cell and damaging the fuel cell even when the first and second switching element are turned on, the first and second switching elements are turned on and off alternately, and thus, it is also possible to make the switching power-source portion execute the voltage-converting operation. It is also possible to keep the output voltage of the fuel cell easily in an output voltage setting favorable for power-generating efficiency by the switching power-source portion.

Accordingly, the power supply device is useful in supplying fuel-cell power to small portable electronic devices such as cellphone, portable information systems such as personal digital assistants (PDA), portable personal computer, and camcorder. It is also applicable to fuel-cell apparatuses such as electric wheelchair, electric scooter, and portable power source.

This application is based on Japanese patent application serial No. 2006-217465, filed in Japan Patent Office on Aug. 9, 2006, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:
1. A power supply device, comprising:
   a first lead terminal and a second lead terminal for connection with a load;
   a fuel cell;
   an energy storage element connected between the first and second lead terminals;
   a synchronous-rectification switching power-source portion for converting an output voltage of the fuel cell to an output voltage of the energy storage element and output it to the first and second lead terminals; and
   a current-detecting portion for detecting an output current of the fuel cell,
   wherein the switching power-source portion includes:
      a coil;
      a first switching element connected between the energy storage element and the coil in series;
      a second switching element connected to the series circuit of the first switching element and the energy storage element in parallel; and
      a controller for:
         turning the first and second switching elements on and off alternately when an output current detected by the current-detecting portion is larger than a preset current threshold, and
         executing a simultaneous-turn-off control of turning off the first and second switching elements simultaneously when the output current detected by the current-detecting portion is not larger than a preset current threshold.

2. The power supply device according to claim 1, further comprising a voltage-detecting portion for detecting an output voltage of the fuel cell, wherein the controller makes the switching power-source portion execute a voltage-converting operation by turning the first and second switching elements on and off alternately when a voltage detected by the voltage-detecting portion is larger than a preset voltage threshold during start-up where the first and second switching elements turn off simultaneously.

3. The power supply device according to claim 1, wherein the controller includes a suspension controlling portion for suspending the simultaneous-turn-off control according to the output current detected by the current-detecting portion for a preset period after starting the voltage-converting operation of the switching power-source portion.

4. The power supply device according to claim 1, wherein the controller adjusts the current flowing from the fuel cell to the switching power-source portion by controlling the duty ratio of turning the first and second switching elements on and off alternately to keep the output voltage of the fuel cell at a set output voltage.

5. The power supply device according to claim 4, wherein one electrode of the fuel cell is connected via the coil and the first switching element to the first lead terminal, and the other electrode of the fuel cell is connected to the secondary lead terminal; and the second switching element is connected between a connection point of the coil and the first switching element and the other electrode of the fuel cell.

6. The power supply device according to claim 5, wherein the duty ratio is an on-duty ratio D of the second switching element; and the controller adjusts the on-duty ratio D so that the output voltage Vin becomes equal to the set output voltage in the following Equation (A) wherein Vout denotes an output voltage of the energy storage element and Vin denotes an output voltage of the fuel cell;

$$V\text{out}/V\text{in}=1/(1-D) \qquad (A).$$

7. A power supply device, comprising:
a first terminal and a second lead terminal for connection with a load;
a fuel cell;
an energy storage element connected between the first and second lead terminals;
a synchronous-rectification switching power-source portion for converting an output voltage of the fuel cell to an output voltage of the energy storage element and outputting it to the first and second lead terminals;
a current-detecting portion for detecting an output current of the fuel cell; and
a voltage-detecting portion for detecting an output voltage of the fuel cell,
wherein the switching power-source portion includes:
a coil;
a first switching element connected between the energy storage element and the coil in series,
a second switching element connected to the series circuit of the first switching element and the energy storage element in parallel, and
a controller for:
turning the first and second switching elements on and off alternately when an output current detected by the current-detecting portion is larger than a preset current threshold,
executing a simultaneous-turn-off control of turning the first and second switching elements off simultaneously when the output current detected by the current-detecting portion is not larger than a preset current threshold,
executing adjustment of adjusting the current flowing from the fuel cell to the switching power-source portion by controlling the duty ratio of turning the first and second switching elements on and off alternately to keep the output voltage of the fuel cell at a set output voltage,
suspending the simultaneous-turn-off control for a preset period when the voltage detected by the voltage-detecting portion is larger than a preset voltage threshold during start-up where the first and second switching elements turn off simultaneously, and
executing the voltage-converting operation by the switching power-source portion by turning the first and second switching elements on and off alternately.

* * * * *